United States Patent [19]

Milne

[11] 3,972,493
[45] Aug. 3, 1976

[54] DOCKING DEVICE FOR A DIRIGIBLE

[76] Inventor: William G. Milne, 500 Bradie Bldg., 630 6th Ave. SW., Calgary, Alberta, Canada, T2P9S8

[22] Filed: Jan. 29, 1975

[21] Appl. No.: 545,321

[52] U.S. Cl. .............................................. 244/115
[51] Int. Cl.² ......................................... B64B 1/66
[58] Field of Search ............... 244/115, 116; 104/44

[56] References Cited
UNITED STATES PATENTS

| | | | |
|---|---|---|---|
| 1,748,500 | 2/1930 | Thaden | 244/115 |
| 1,749,065 | 3/1930 | Burney | 244/116 |
| 1,770,675 | 7/1930 | Short | 244/116 |
| 1,806,939 | 5/1931 | Grampp | 244/115 |
| 1,865,790 | 7/1932 | Rosendahl | 244/115 |
| 1,900,744 | 3/1933 | Strobl | 244/128 |
| 2,094,619 | 10/1937 | Reichert et al. | 244/128 |
| 2,150,428 | 3/1939 | Crum et al. | 244/115 |
| 3,456,903 | 7/1969 | Papst | 244/30 |
| 3,488,019 | 1/1970 | Sonstegaard | 244/30 |
| 3,531,064 | 9/1970 | McCutchan | 244/31 |
| 3,567,160 | 3/1971 | Adams | 244/115 |
| 3,620,485 | 11/1971 | Gelhard | 244/128 |
| 3,706,433 | 12/1972 | Sonstegaard | 244/128 |

FOREIGN PATENTS OR APPLICATIONS

| | | |
|---|---|---|
| 809,695 | 3/1959 | United Kingdom |
| 231,906 | 6/1926 | United Kingdom ............... 244/116 |

OTHER PUBLICATIONS

"1984: A Brave New World for Shell?" *News and Comment*, p. 580.

Primary Examiner—Trygve M. Blix
Assistant Examiner—Galen L. Barefoot
Attorney, Agent, or Firm—Larson, Taylor and Hinds

[57] ABSTRACT

A docking device for a dirigible. A supporting and securing structure is rotatably mounted on a circular track, the structure rotating about a centrally located member which may include a gas conduit for conveying gas into or out of a dirigible docked on the device. The docking device will allow the dirigible to dock and freely weathervane in the wind, even when unloading or loading a gas.

1 Claim, 3 Drawing Figures

DOCKING DEVICE FOR A DIRIGIBLE

FIELD OF THE INVENTION

The buoyancy of natural gas makes transport of the gas in a dirigible an economically attractive project. In such a craft, the cargo would provide the necessary lifting force for the dirigible. The use of such a dirigible offers many advantages over transporting gas through a pipeline or in ships in its liquid state. Construction of a fleet of dirigibles is a smaller capital investment than a major pipeline. Because the dirigible would transport the gas in its natural state, no expensive conversion plants would be required as in transport in the liquid state.

However, to be economically feasible, the dirigible must be large. The large size of such a craft presents problems in making a docking device for the craft. The device for docking should secure the dirigible and also allow for loading and unloading the natural gas cargo. When docked, for loading and unloading purposes, the large size of the dirigible makes it susceptible to large wind forces. Such a docking device must minimize such large wind forces to prevent damage to the aircraft and to the docking device.

A dirigible must also have a haven in severe storms. Its large size would make a hanger impractical. If docked on the ground, the exposure to wind forces and possible wind damage still presents a problem. Therefore, any practical docking device must minimize wind damage. A docking device that would allow the dirigible to weathervane to offer the least wind resistance is one way to minimize damage to the dirigible.

SUMMARY OF THE INVENTION

The invention relates to a docking device for a dirigible. The device includes a cradle member for supporting a docked dirigible, the cradle securing the dirigible while docked and having structural components to support the dirigible in a horizontal position. The cradle is rotatably mounted to allow the docked dirigible and cradle to rotate around a pivot point to align the dirigible with the prevailing wind direction.

As mentioned above, there are many problems associated in docking a dirigible to be used in transporting natural gas. The size of the aircraft would present considerable problems in the wind when docked on the ground for loading or storage. This invention overcomes the problems of high wind forces because the docking device is rotatably mounted around a central point. This allows the docked dirigible to freely weathervane in the wind so as to minimize its wind profile and corresponding wind forces. Such a docking device would provide an earthbound haven in a storm that would expose the dirigible to minimal wind damage.

Other features and advantages of the present invention will be set forth in or apparent from the detailed description of preferred embodiments of the invention found hereinbelow.

DESCRIPTION OF THE INVENTION

Figure 1:
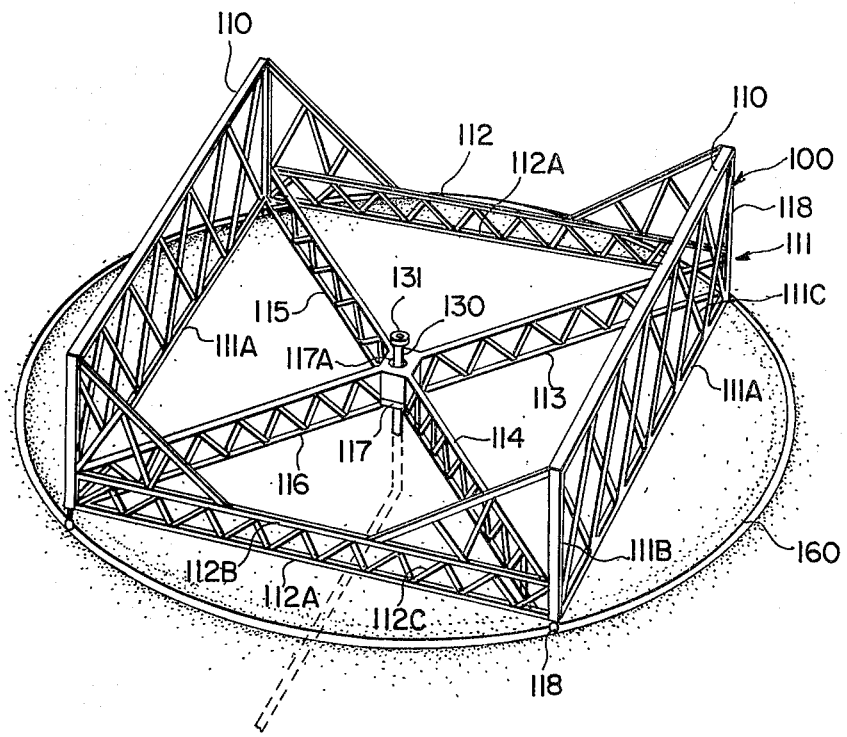
FIG. 1 is a perspective view of the docking device as seen looking down from above.

The embodiment of the invention chosen for purposes of illustration is seen in FIG. 1. The docking is denoted as 100. The docking device 100 has two horizontal, and at least generally parallel dirigible support members 110. These support members 110 are positioned to be received by mating straight docking support structures 11 on the dirigible 10 as seen in FIGS. 2 and 3.

Figure 3:
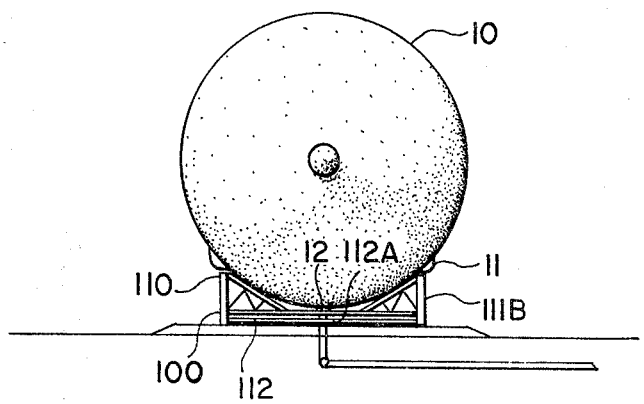
FIG. 3 is a front elevational view of the docking device with a dirigible docked in place.

The docking device 100 must accomodate a docked dirigible 10 having a substantially transverse circular cross section as seen in FIG. 3. Docking cradle 100 docks and secures dirigible 10. Dirigible 10 has an elongated body with a transverse circular cross section, as seen in FIGS. 2-3 and transports a cargo of natural gas. The dirigible 10 has horizontal, parallel docking structures 11 symmetrically located on the outside surface of the dirigible in a horizontal plane below the central longitudinal axis of the dirigible. A gas unloading-loading main 12 protrudes from the bottom surface of the dirigible at its lowermost point intermediate the ends of the dirigible and has a gas coupling 12A on its end. For further details on the dirigible 10, see copending application Ser. No. 545,319 filed Jan. 29, 1975 herein incorporated by reference.

Figure 2:
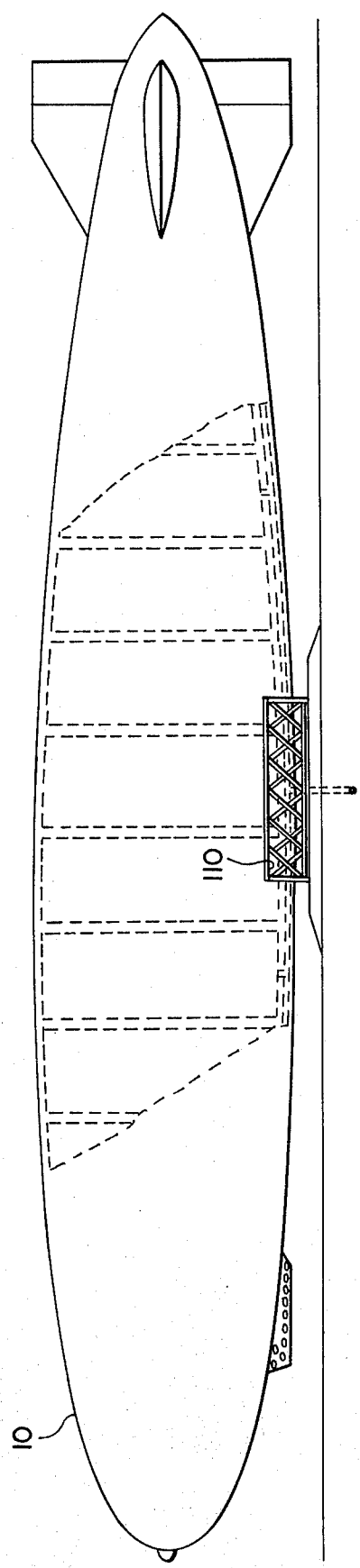
FIG. 2 is a side elevational view of the docking device with a dirigible docked in place.

Dirigible support means 110 on cradle 100 are positioned to be received by mating horizontal, straight, and parallel docking structures 11 on the dirigible 10 as seen in FIGS. 2 and 3. While the embodiment chosen for the purposes of illustration has two parallel supporting means, the invention encompasses any support means that will maintain the dirigible 10 in a substantially horizontal plane.

The docking cradle 11 is substantially square in plan view, having parallel, straight sides 111 and parallel, straight front and back structures 112 which are perpendicular to sides 111. Four structural members, 113, 114, 115, 116 extend inward from each corner and are joined to the geometrical centerpiece of the structure 117. The centerpiece 117 contains a vertical hollow cylinder 117A. Sides 111 are rectangular in shape in the side elevational view, having a bottom horizontal member 111A, vertical sides 111B, the docking support means 110 on top, and structural reinforcement 111C filling in the interior of the rectangle. The front and back panels 112 are also rectangular in shape, having a horizontal bottom member 112A, a horizontal top member 112B, a reinforcing web 112C between them, and sides formed by portions of the vertical sides 111B of sides 111. The bottom members 111A and 112A are in a horizontal plane. Sides 111B support the docking means 110 in a horizontal plane at an elevation to cradle a dirigible 10 of circular cross section and allow clearance for the dirigible gas filling main 12 above front and back structure bars 112B. On each corner of the horizontal square formed by members 111A and 112A are wheels 118.

A vertical gas unloading main 130 protrudes through cylindrical passage 117A in the centerpiece 117 of docking cradle 100. The gas main 130 is connected to a underground distribution system (not shown). The gas main 130 has a rotating coupling 131 which mates with the gas main coupling 12A on dirigible 10. The seal between couplings 131 and 12A allows 360° of rotation without leaking. Gas main 130 is used to load and unload the cargo gas into and out of dirigible 10.

Referring to FIG. 1, there is a horizontal circular track 160 located under the docking device 100. The circular track 160 has a diameter equal to the combined length of members 114 and 115. The circular track 160 is oriented to be horizontal with the vertical gas main 130 located at its center. Wheels 118 secured at the corners of the docking cradle 100 ride on the track 160 and support the docking cradle 100. This allows the docking cradle 100 to rotate around the gas loading-unloading main 130. Wheels 118 in this embodiment are spaced 90° apart along track 160.

Alternatively, the docking cradle can be rotatably mounted on a central vertical axle. The axle could be mounted on a large bearing to allow the docking cradle to rotate 360°. The gas main could protrude through the center of the annular axle to load and unload gas from the docked dirigible.

The docking device 100 allows a dirigible 10, to dock by nesting between docking support bars 110 and mating them with dirigible docking supports 11. Once the support means 110 and docking supports 11 are properly mated and secured as desired, the dirigible will be situated with its longitudinal centerline substantially parallel to the docking supporting means 110.

When docked, the dirigible will be in a position to connect the unloading-loading gas main 12 to the unloading-loading gas main 130 which protrudes through the docking cradle centerpiece 117. Once connected, the dirigible 10 can be loaded or unloaded with gas.

While docked, the dirigible will present a considerable wind resistance. The least wind resistance will exist with the dirigible oriented with its front into the wind. The rotatable gas main connection 131 and the docking cradle 100 rotatably mounted on circular track 160 allows the docked dirigible to rotate about the gas main 130. This ability to rotate allows the docked dirigible to weathervane in the wind so as to always present the profile of least resistance to the wind. In this manner, wind damage to the dirigible is minimized and the docking device is subjected to minimum stress.

Although the invention has been described in detail with respect to exemplary embodiments thereof, it will be understood by those of ordinary skill in the art that variations and modifications may be effected within the scope and spirit of the invention.

What is claimed is:

1. A docking device for a gas cargo carrying dirigible that has a substantially transverse circular cross section and horizontally extending docking structures mounted on the outside surface of the dirigible in a plane below the central longitudinal axis of the dirigible, and has a loading-unloading gas main depending from the bottom surface of the dirigible centrally located intermediate the ends thereof, said docking device comprising:

a cradle support member for supporting a docked dirigible at only a centrally located portion thereof, said cradle member comprising a webbed frame having a substantially symmetrical base section and a top section with horizontally extending support means conforming to the dirigible docking structures for supporting engagement therewith;

a plurality of support means spaced circumferentially to the bottom of said base section thereby defining a circle for rotatably supporting said cradle support member on a circular track for rotating about a pivot point in a substantially horizontal plane such that a dirigible docked in said cradle member may rotate with said cradle member about said pivot point such that a docked dirigible may be aligned with a prevailing wind direction; and means for conveying a fluid to the dirigible gas main, said conveying means centrally supported on said cradle support member and comprising a conduit including a rotatable coupling located at said pivot point, and means for placing said conduit into fluid communication with the interior of a dirigible docked in said cradle such that dirigible is free to weathervane with said cradle while a fluid is being conveyed into or out of the interior of said dirigible.

* * * * *